US011637953B2

(12) United States Patent
Han et al.

(10) Patent No.: US 11,637,953 B2
(45) Date of Patent: Apr. 25, 2023

(54) METHOD, APPARATUS, ELECTRONIC DEVICE, STORAGE MEDIUM AND SYSTEM FOR VISION TASK EXECUTION

(71) Applicant: RESEARCH INSTITUTE OF TSINGHUA UNIVERSITY IN SHENZHEN, Shenzhen (CN)

(72) Inventors: Yuxing Han, Shenzhen (CN); Jiangtao Wen, Shenzhen (CN)

(73) Assignee: RESEARCH INSTITUTE OF TSINGHUA UNIVERSITY IN SHENZHEN, Shenzhen (CN)

( * ) Notice: Subject to any disclaimer, the term of this patent is extended or adjusted under 35 U.S.C. 154(b) by 61 days.

(21) Appl. No.: 17/320,862

(22) Filed: May 14, 2021

(65) Prior Publication Data
US 2021/0368095 A1  Nov. 25, 2021

Related U.S. Application Data

(60) Provisional application No. 63/027,405, filed on May 20, 2020.

(51) Int. Cl.
*H04N 5/232* (2006.01)
*G06T 5/00* (2006.01)
*G06N 3/08* (2023.01)
*G06K 9/62* (2022.01)

(52) U.S. Cl.
CPC ....... *H04N 5/23229* (2013.01); *G06K 9/6256* (2013.01); *G06N 3/08* (2013.01); *G06T 5/002* (2013.01); *H04N 5/23222* (2013.01)

(58) Field of Classification Search
None
See application file for complete search history.

(56) References Cited

U.S. PATENT DOCUMENTS

| | | | |
|---|---|---|---|
| 10,740,920 B1 * | 8/2020 | Ebrahimi Afrouzi | G06V 10/751 |
| 2017/0185871 A1 * | 6/2017 | Zhang | G06K 9/6271 |
| 2018/0189325 A1 * | 7/2018 | Hohwald | G06F 16/5838 |
| 2019/0159737 A1 * | 5/2019 | Buckler | G06T 7/0012 |
| 2020/0234406 A1 * | 7/2020 | Ren | G06T 5/001 |
| 2021/0044725 A1 * | 2/2021 | Powell | G06T 7/80 |
| 2021/0239618 A1 * | 8/2021 | Cheng | G06N 3/0454 |
| 2021/0297582 A1 * | 9/2021 | Brown | H04N 9/045 |

* cited by examiner

*Primary Examiner* — James M Hannett
(74) *Attorney, Agent, or Firm* — Dilworth IP, LLC

(57) ABSTRACT

The present disclosure relates to a method, apparatus, electronic device, storage medium and system for vision task execution, and belongs to the technical field of information. The method includes: acquiring raw image data which is collected by an image sensor and not processed by an image signal processor (ISP); and inputting the raw image data into a trained first raw image neural network for executing a target vision task to obtain a vision task processing result output by the first raw image neural network, wherein the first raw image neural network is obtained based on training with an raw image training set. A vision task in response is executed by employing the raw image data so as to solve the problems that the quantity of image data processed by the ISP is relatively large, and related information may be lost in the related art.

16 Claims, 3 Drawing Sheets

METHOD, APPARATUS, ELECTRONIC DEVICE, STORAGE MEDIUM AND SYSTEM FOR VISION TASK EXECUTION

CROSS-REFERENCE TO RELATED APPLICATION

The present application claims priority benefits to U.S. Provisional Application No. 63/027,405 filed on May 20, 2020, the contents of which are incorporated herein by reference.

TECHNICAL FIELD

The present disclosure relates to the technical field of information technology, in particular to a method, apparatus, electronic device, storage medium and system for vision task execution.

BACKGROUND ART

In the current imaging system, image data collected by the image sensor may be subjected to processing including rasterization elimination, denoising and white balance by an image signal processor (ISP); and the data processed by the ISP is reconstructed into an image sequence with high temporal-spatial resolution to meet the demands of human audiences for a more appreciated image, while the information theory shows that the information cannot be acquired from information processing but can be lost during information processing only. Moreover, because the resolution and the precision of an imaging device are rapidly improved, the quantity of data which is reconstructed into the image sequence with high temporal-spatial resolution is very large, which brings difficulty to an artificial neural network which is subjected to visual data mining and training for computer vision and neural network based inference.

SUMMARY OF THE INVENTION

In order to solve the problems in the related art, the present disclosure provides a method, apparatus, electronic device, storage medium and system for vision task execution.

In order to achieve the above object, a first aspect of the present disclosure provides the vision task execution method which includes:

acquiring raw image data which is collected by an image sensor and not processed by an image signal processor (ISP); and inputting the raw image data into a trained first raw image neural network for executing a target vision task to obtain a vision task processing result output by the first raw image neural network, wherein the first raw image neural network is obtained based on training with an raw image training set.

Alternatively, training of the first raw image neural work includes:

inputting traditional training images with labels into an ISP inverse mapping model trained in advance to obtain raw image training samples, wherein the raw image training set includes the raw image training samples; and training the first raw image neural network according to the raw image training set.

Alternatively, training of the first raw image neural work further includes:

inputting the traditional training images with the labels into an aliasing model trained in advance to obtain sub-Nyquist image data, wherein the raw image training set further includes the sub-Nyquist image data.

Alternatively, the method further includes:

determining a maximum allowable quantization level corresponding to the target vision task; and determining a minimum spatial-temporal sampling frequency corresponding to the target vision task, wherein the maximum allowable quantization level and the minimum spatial-temporal sampling frequency are back-propagated to the image sensor to enable a quantization level and a spatial-temporal sampling frequency of the image sensor to be adjusted according to the maximum allowable quantization level and the minimum spatial-temporal sampling frequency.

Acquiring the raw image data collected by the image sensor includes:

acquiring the raw image data collected by the image sensor with the adjusted quantization level and spatial-temporal sampling frequency.

Alternatively, determining the maximum allowable quantization level corresponding to the target vision task includes:

acquiring multiple groups of compressed image data, wherein the quantization level of the image data in arbitrary one group of compressed image data is identical and lower than an average quantization level of the raw image training set, and the quantization level of the image data in arbitrary one group of compressed image data is different from that of the image data in another group of compressed image data;

dividing the image data in the multiple groups of compressed image data into training sets and testing sets, and training and testing a second raw image neural network for executing the target vision task according to the training set and the testing set of each group of compressed image data to obtain testing results of tests on the multiple trained second raw image neural networks; and determining a target raw image neural network, an execution result of which for the target vision task meets a first preset condition, in the multiple trained second raw image neural networks according to the testing results, and taking the maximum quantization level of the compressed image data for training the target raw image neural network as the maximum allowable quantization level of the target vision task.

Alternatively, determining the minimum spatial-temporal sampling frequency corresponding to the target vision task includes:

acquiring multiple groups of sub-Nyquist image data, wherein spatial-temporal sampling frequencies of the image data in arbitrary one group of sub-Nyquist image data are identical and are different from those of the image data in another group of sub-Nyquist image data;

dividing the image data in multiple groups of sub-Nyquist image data into training sets and testing sets, and training and testing a third raw image neural network for executing the target vision task according to the training set and the testing set of each group of sub-Nyquist image data to obtain testing results of tests on the multiple trained third raw image neural networks; and determining a target raw image neural network, an execution result of which for the target vision task meets a second preset condition, in the multiple trained third raw image neural networks according to the testing results, and taking the minimum spatial-temporal sampling frequency of the sub-Nyquist image data for training the target raw image neural network which meets the second preset condition as the minimum spatial-temporal sampling frequency of the target vision task.

A second aspect of the present disclosure provides a vision task execution apparatus which includes:

an acquiring module, used for acquiring the raw image data collected by the image sensor; and a processing module, used for inputting the raw image data into a trained raw image neural network for executing a target vision task to obtain a vision task processing result output by the raw image neural network, wherein the raw image neural network is obtained based on training with an raw image training set.

Alternatively, the apparatus includes:

a first determining module, used for determining a maximum allowable quantization level corresponding to the target vision task;

a second determining module, used for determining a minimum spatial-temporal sampling frequency corresponding to the target vision task; and a back-propagation module, used for back-propagating the maximum allowable quantization level and the minimum spatial-temporal sampling frequency to the image sensor to enable a quantization level and a spatial-temporal sampling frequency of the image sensor to be adjusted according to the maximum allowable quantization level and the minimum spatial-temporal sampling frequency.

The acquiring module is further used for acquiring the raw image data collected by the image sensor with the adjusted quantization level and spatial-temporal sampling frequency.

A third aspect of the present disclosure provides a non-transitory computer readable storage medium, having a computer program stored thereon; and when the program is executed by a processor, the steps of the method of any one in the first aspect of the present disclosure are implemented.

A fourth aspect of the present disclosure provides an electronic device which includes:

a memory, having a computer program stored thereon; and a processor, used for executing the computer program stored in the memory to implement the steps of any one of the methods in the first aspect of the present disclosure.

The fourth aspect of the present disclosure provides a vision task system which includes an image sensor and the electronic device disclosed in the second aspect of the present disclosure.

According to the above technical solution, a model executing a vision task directly based on raw images can be obtained by training a neural network with the raw images. Because the raw image data from the sensor does not need to be processed by the ISP, loss of image information can be avoided, the processing time of the image data can also be shortened, and a response speed is increased.

Other features and advantages of the present disclosure will be described in detail in the following detailed description.

BRIEF DESCRIPTION OF THE DRAWINGS

The accompanying drawings are included to provide a further understanding of the present disclosure and constitute a part of this application, serve to explain the present disclosure together with the following detailed description, but do not limit the present disclosure. In the drawings.

DETAILED DESCRIPTION OF THE INVENTION

The embodiments of the present disclosure will be described below in detail with reference to the accompanying drawings. It should be appreciated that the specific embodiments disclosed herein are intended to describe and illustrate the present disclosure and are not used for limiting the present disclosure.

Figure 1:
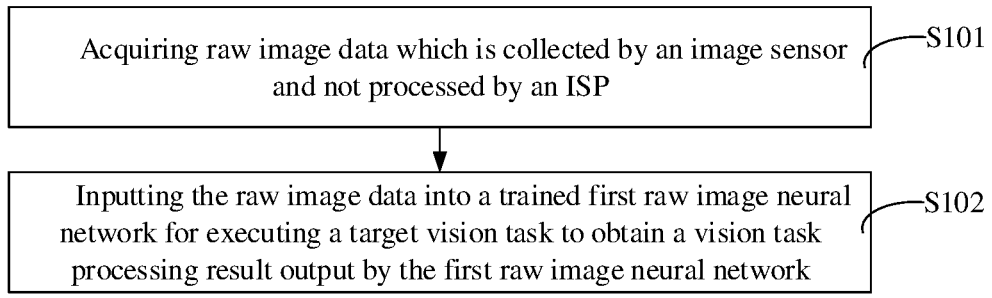
FIG. 1 is a flow chart of a vision task execution method shown according to an exemplary embodiment.

FIG. 1 is a flow chart of a vision task execution method shown according to an exemplary embodiment. An execution main body of the method may be the electronic device with the information processing capability, for example, a mobile phone, a computer, a microcomputer and the like. The method includes the following steps:

S101, raw image data which is collected by an image sensor and not processed by an ISP is acquired, wherein the raw image data may be pictures and also videos; and S102, the raw image data is input into a trained first raw image neural network for executing a target vision task to obtain a vision task processing result output by the first raw image neural network, wherein the first raw image neural network is obtained based on training with a raw image training set. Moreover, the target vision task may be tasks of detection, recognition, tracing and the like, and the present disclosure does not limit a specific task target of the target vision task.

It should be understood by those skilled in the art that many ISP-related operations aiming at enabling the images and the videos to more accord with human eyes are unnecessary for computer vision and visual data mining. In fact, the information theory shows that the information cannot be acquired from information processing but can be lost during information processing only.

In the embodiments of the present disclosure, a model executing a vision task directly based on raw image can be obtained by training a neural network with the raw image Because the raw image data from the sensor does not need to be processed by the ISP, loss of image information can be avoided, the processing time of the image data can also be shortened, and a response speed is increased.

Figure 2:
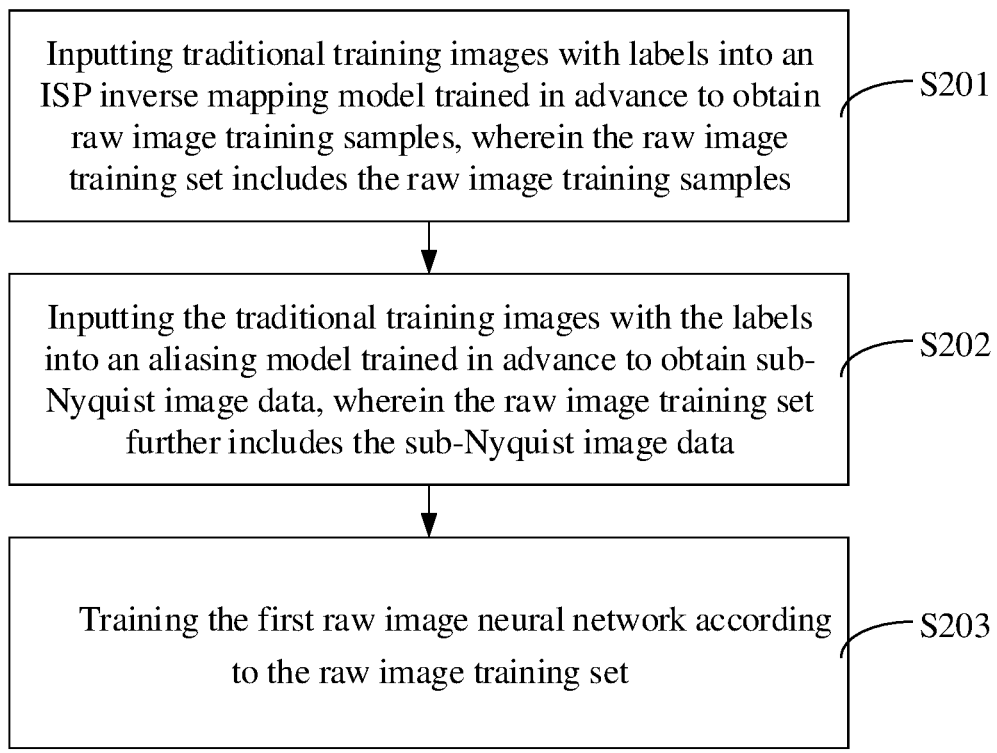
FIG. 2 is a flow chart of training of an raw image neural network shown according to an exemplary embodiment.

In some alternative embodiments, training of the first raw image neural network includes the steps of the method shown in FIG. 2. FIG. 2 is a flow chart of training of an raw image neural network shown according to an exemplary embodiment.

S201, traditional training images with labels are input into an ISP inverse mapping model trained in advance to obtain raw image training samples, wherein the raw image training set includes the raw image training samples.

S203, the first raw image neural network is trained according to the raw image training set, wherein the ISP inverse mapping model is used for converting the traditional images processed by the ISP to the raw image data not processed by the ISP.

It should be understood by those skilled in the art that, relative to unlimited number of traditional training images (i.e. images processed by the ISP) which have label comments and can be found in the network, there is little high-quantity raw image data which can be used for training.

Therefore, by employing the technical solution, the easily found traditional training images can be converted to raw image training samples which can be used for training through the ISP inverse mapping model, and the first neural network is trained based on the raw image training samples, so that the problem of insufficient raw image training samples in the related art is solved.

In other embodiments, training of the first raw image neural network further includes the following step as shown in FIG. 2:

S202, the traditional training images with the labels are input into an aliasing model trained in advance to obtain sub-Nyquist image data, wherein the raw image training set further includes the sub-Nyquist image data, wherein the aliasing model is used for adding aliasing images in the traditional training picture and video data, and sub-Nyquist noises are introduced.

It should also be understood by those skilled in the art that, in the traditional Shannon-Nyquist sampling theory, a relatively high spatial-temporal sampling frequency is employed usually to avoid aliasing, while for machine vision performance, the effect of noises introduced into the image information by sub-Nyquist frequency sampling is limited.

However, existing image sensors are all designed with a target that a sampling frequency is higher than a Nyquist frequency generally, and the sub-Nyquist images are difficultly acquired if there is no nontraditional sub-Nyquist image sensor.

Therefore, by employing the technical solution, the raw image neural network is trained by converting the easily found traditional training images to sub-Nyquist training samples which can be used for training through the aliasing model, so that the raw image neural network can execute the target vision task for the raw image data and also the vision task in response for images with the sampling frequencies lower than the Nyquist frequencies.

In some alternative embodiments, the method further includes:

a maximum allowable quantization level corresponding to the target vision task is determined; and a minimum spatial-temporal sampling frequency corresponding to the target vision task is determined.

The maximum allowable quantization level and the minimum spatial-temporal sampling frequency are back-propagated to the image sensor to enable a quantization level and a spatial-temporal sampling frequency of the image sensor to be adjusted according to the maximum allowable quantization level and the minimum spatial-temporal sampling frequency.

Acquiring the raw image data collected by the image sensor includes:

the raw image data collected by the image sensor with the adjusted quantization level and spatial-temporal sampling frequency is acquired.

It should also be understood by those skilled in the art that, visual information related to computer vision is sparse and task-specific, for example, the image quality required by a target detection task is obviously different from that required by a target recognition task. Moreover, the resolutions and the precisions of the existing imaging devices are all very high, the quantity of acquired data is very large, and such high resolutions and precisions are unnecessary for some vision tasks.

According to the technical solution, by employing the image sensor capable of being adjusted in quantization level and spatial-temporal sampling frequency, the quantization level and the spatial-temporal sampling frequency of the image sensor can be adjusted according to different vision tasks to minimize the quantity of the collected raw image data, and thus speeds of transmission through a communication channel and storage of image and video information in various storage media are increased.

In some alternative embodiment, determining the maximum allowable quantization level corresponding to the target vision task includes:

multiple groups of compressed image data are acquired, wherein the quantization level of the image data in arbitrary one group of compressed image data is identical and lower than an average quantization level of the raw image training set, and the quantization level of the image data in arbitrary one group of compressed image data is different from that of the image data in another group of compressed image data;

the image data in the multiple groups of compressed image data is divided into training sets and testing sets, and a second raw image neural network for executing the target vision task is trained and tested according to the training set and the testing set of each group of compressed image data to obtain testing results of tests on the multiple trained second raw image neural networks; and a target raw image neural network, an execution result of which for the target vision task meets a first preset condition, in the multiple trained second raw image neural networks is determined according to the testing results, and the maximum quantization level of the compressed image data for training the target raw image neural network is taken as the maximum allowable quantization level of the target vision task.

The quantization level of a picture or a video may be obviously increased by compressing the picture or the video. According to the technical solution, by grouping the compressed image data according to the quantization level, training the raw image neural network and testing the trained raw image neural network through the testing sets, it is determined that the testing results show that the maximum allowable quantization level of the input image data of the target vision task can be relatively good completed and is back-propagated to the image sensor to determine the minimum quality required by collection of imaging information, so that the quantity of the collected raw image data is lowered, and the speeds of transmission through the communication channel and storage of the image and video information in various storage media are increased.

In yet other alternative embodiments, determining the minimum spatial-temporal sampling frequency corresponding to the target vision task includes:

multiple groups of sub-Nyquist image data are acquired, wherein spatial-temporal sampling frequencies of the image data in arbitrary one group of sub-Nyquist image data are identical and are different from those of the image data in another group of sub-Nyquist image data;

the image data in multiple groups of sub-Nyquist image data is divided into training sets and testing sets, and a third raw image neural network for executing the target vision task is trained and tested according to the training set and the testing set of each group of sub-Nyquist image data to obtain testing results of tests on the multiple trained third raw image neural networks; and a target raw image neural network, an execution result of which for the target vision task meets a second preset condition, in the multiple trained third raw image neural networks is determined according to the testing results, and the minimum spatial-temporal sampling frequency of the sub-Nyquist image data for training the target raw image neural network which meets the second preset condition serves as the minimum spatial-temporal sampling frequency of the target vision task.

According to the technical solution, by grouping the image data at the spatial-temporal sampling frequency lower than the Nyquist frequency, training the raw image neural network and testing the trained raw image neural network through the testing sets, it is determined that the testing results show that the minimum spatial-temporal sampling frequency of the input image data of the target vision task can be relatively good completed and is back-propagated to the image sensor, so that the image sensor processes the image data with the minimum spatial-temporal sampling frequency when collecting the raw image data, to determine the minimum quality required by collection of imaging information, the quantity of the raw image data is lowered, and the transmission efficiency of image data transmission and storage of the data storage efficiency are improved.

Further, the sub-Nyquist image data may also be acquired through the method of the step S202 in FIG. 2, and at this time, the sub-Nyquist image data at different spatial-temporal sampling frequencies is acquired by adjusting related parameters of the aliasing model.

Figure 3:
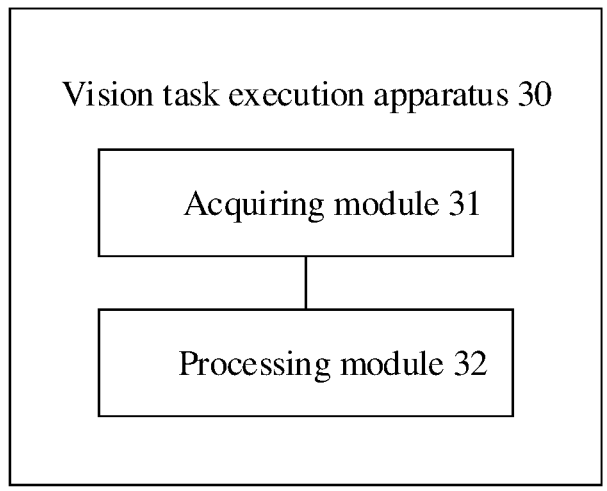
FIG. 3 is a block diagram of a vision task execution apparatus shown according to an exemplary embodiment.

FIG. 3 is a block diagram of a vision task execution apparatus 30 shown according to an exemplary embodiment. The apparatus 30 includes:

an acquiring module 31, used for acquiring the raw image data collected by the image sensor; and a processing module 32, used for inputting the raw image data into a trained raw image neural network for executing a target vision task to obtain a vision task processing result output by the raw image neural network, wherein the raw image neural network is obtained based on training with an raw image training set.

Figure 4:
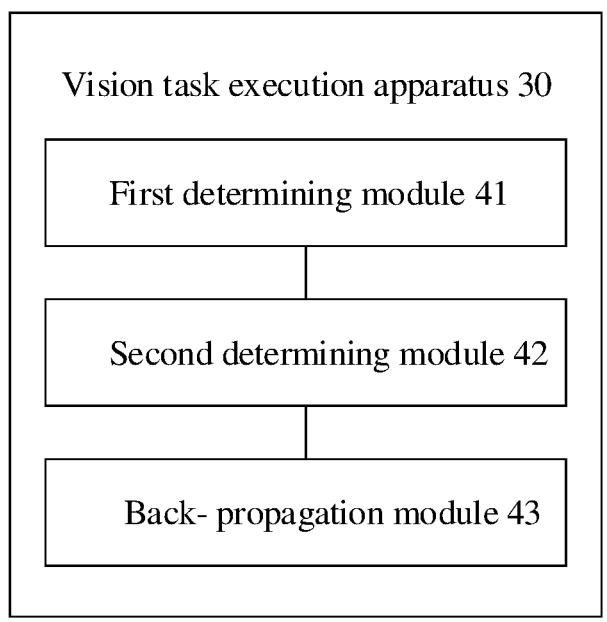
FIG. 4 is another block diagram of the vision task execution apparatus shown according to an exemplary embodiment.

Alternatively, the apparatus 30 further includes the following components as shown in FIG. 4:

a first determining module 41, used for determining a maximum allowable quantization level corresponding to the target vision task;

a second determining module 42, used for determining a minimum spatial-temporal sampling frequency corresponding to the target vision task; and a back-propagation module 43, used for back-propagating the maximum allowable quantization level and the minimum spatial-temporal sampling frequency to the image sensor to enable a quantization level and a spatial-temporal sampling frequency of the image sensor to be adjusted according to the maximum allowable quantization level and the minimum spatial-temporal sampling frequency.

The acquiring module 31 is specifically used for:

acquiring the raw image data collected by the image sensor with the adjusted quantization level and spatial-temporal sampling frequency.

Alternatively, the first determining module 41 includes:

a first acquiring submodule, used for acquiring multiple groups of compressed image data, wherein the quantization level of the image data in arbitrary one group of compressed image data is identical and lower than an average quantization level of the raw image training set, and the quantization level of the image data in arbitrary one group of compressed image data is different from that of the image data in another group of compressed image data;

a first training submodule, used for dividing the image data in the multiple groups of compressed image data into training sets and testing sets and training and testing a second raw image neural network for executing the target vision task according to the training set and the testing set of each group of compressed image data to obtain testing results of tests on the multiple trained second raw image neural networks; and a second determining submodule, used for determining a target raw image neural network, an execution result of which for the target vision task meets a first preset condition, in the multiple trained second raw image neural networks according to the testing results and taking the maximum quantization level of the compressed image data for training the target raw image neural network as the maximum allowable quantization level of the target vision task.

Alternatively, the second determining module 42 includes:

a second acquiring submodule, used for acquiring multiple groups of sub-Nyquist image data, wherein spatial-temporal sampling frequencies of the image data in arbitrary one group of sub-Nyquist image data are identical and are different from those of the image data in another group of sub-Nyquist image data;

a second training submodule, used for dividing the image data in multiple groups of sub-Nyquist image data into training sets and testing sets and training and testing a third raw image neural network for executing the target vision task according to the training set and the testing set of each group of sub-Nyquist image data to obtain testing results of tests on the multiple trained third raw image neural networks; and a second determining submodule, used for determining a target raw image neural network, an execution result of which for the target vision task meets a second preset condition, in the multiple trained third raw image neural networks according to the testing results, and taking the minimum spatial-temporal sampling frequency of the sub-Nyquist image data for training the target raw image neural network which meets the second preset condition as the minimum spatial-temporal sampling frequency of the target vision task.

In the embodiments of the present disclosure, a model executing a vision task directly based on raw image can be obtained by training a neural network with the raw images As the raw image data from the sensor does not need to be processed by the ISP, loss of image information can be avoided, the processing time of the image data can also be shortened, and a response speed is increased.

For the apparatus in the foregoing embodiment, a specific manner of each module in the apparatus performing an operation is already described in the method-related embodiment in detail, and is no longer described herein in detail.

Figure 5:
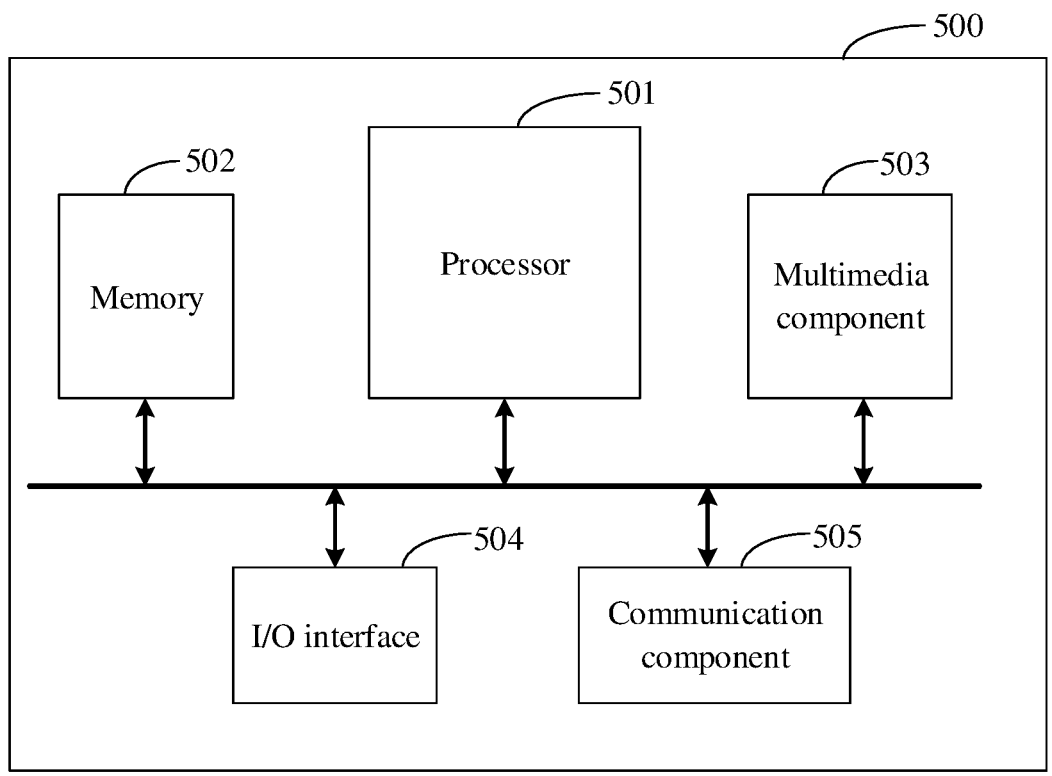
FIG. 5 is a block diagram of an electronic device shown according to an exemplary embodiment.

FIG. 5 is a block diagram of an electronic device 500 shown according to an exemplary embodiment. As shown in FIG. 5, the electronic device 500 may include: a processor 501 and a memory 502. The electronic device 500 may further include: one or more of a multimedia component 503, an input/output (I/O) interface 504 and a communication component 505, wherein the processor 501 is used for controlling an overall operation of the electronic device 500 to complete the whole steps of partial steps in the above vision task execution method. The memory 502 is used for storing various types of data to support the operation of the electronic device 500. The data, for example, may include commands for any application program or method operated in the electronic device 500, and data related to the application programs, for example, raw image picture data, raw image video data, traditional training data, sub-Nyquist image data and the like. The memory 502 may be achieved with any type of volatile memory device, any type of nonvolatile memory device or combination thereof, for example, a static random access memory (SRAM), an electrically erasable programmable read-only memory (EEPROM), an erasable programmable read-only memory (EPROM), a programmable read-only memory (PROM), a read-only memory (ROM), a magnetic memory, flash memory, a magnetic disk or an optical disk; the multimedia component 503 may include a screen and an audio component, wherein the screen, for example, may be a touch screen, and the audio component is used for outputting and/or inputting audio signals, for example, the audio component may include a microphone used for receiving an external audio signals; the received audio signal may be further stored in the memory 502 or sent through the communication component 505; the audio component may further include at least one loudspeaker for outputting the audio signal; the I/O interface 504 provides an interface between the processor 501 and other interface modules, the above other interface modules may be keyboards, mouses, buttons and the like, and these buttons may be virtual buttons or entity buttons; the communication component 505 is used for wired or wireless communication between the electronic device 500 and other devices; and wireless communication, for example, Wi-Fi, Bluetooth, near field communication (NFC), 2G, 3G, 4G, NB-IOT, eMTC, other 5G or a combination of one or more of the above are not limited here, and therefore, the corresponding communication component 505 may include an Wi-Fi module, a Bluetooth module, an NFC module and the like.

In an exemplary embodiment, the electronic device 500 may be implemented by one or more application specific integrated circuits (ASIC), digital signal processors (DSP), digital signal processing devices (DSPD), programmable logic devices (PLD), field programmable gate arrays (FPGA), controllers, microcontrollers, microprocessors or other electronic elements and is used for executing the above vision task execution method.

In another exemplary embodiment, a computer readable storage medium including a computer program is further provided, and the steps of the above vision task execution method are implemented when the computer program is executed by the processor. For example, the computer readable storage medium may be the memory 502 including the computer program, and the computer program may be executed by the processor 501 of the electronic device 500 to complete the above vision task execution method.

In another exemplary embodiment, a computer program product is further provided. The computer program product includes a computer program which may be executed by a programmable apparatus, and the computer program has a code portion used for executing the above vision task execution method when the computer program is executed by the programmable apparatus.

Figure 6:
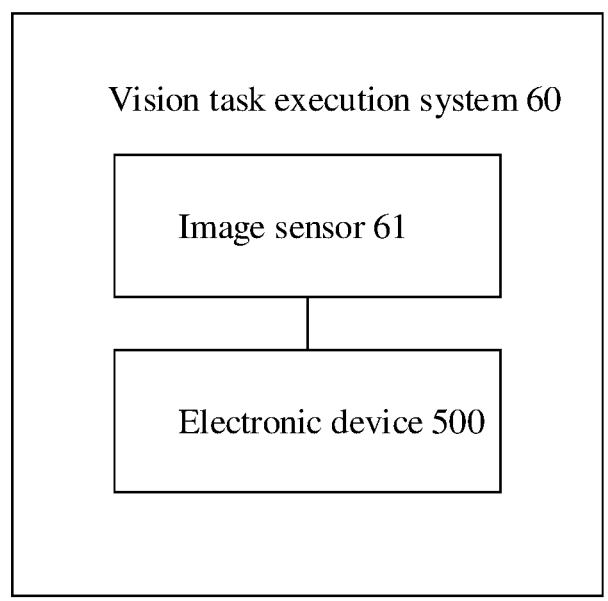
FIG. 6 is a block diagram of a vision task execution system shown according to an exemplary embodiment.

FIG. 6 is a block diagram of a vision task execution system 60 shown according to an exemplary embodiment. As shown in FIG. 6, the vision task execution system 60 includes an image sensor 61 and the electronic device 500. The image sensor 61 is used for acquiring the raw image data and sending the raw image data to the electronic device 500, and the electronic device 500 is used for executing the above vision task execution method.

In one embodiment, the quantization level and the spatial-temporal sampling frequency of the image sensor 61 can be adjusted according to the maximum allowable quantization level and the minimum spatial-temporal sampling frequency sent by the electronic device 500.

The preferred embodiments of the present disclosure are described in detail above in combination with the accompanying drawings, but the present disclosure is not limited to the details in the above embodiments. Various simple variations may be made to the technical solution of the present disclosure within the range of technical concept of the present disclosure and all belong to the protection scope of the present disclosure.

Furthermore, it should be noted that various specific technical features described in the above specific embodiments may be combined in any suitable manner in case of no contradiction. To avoid unnecessary repetition, various potential combination manners are not described additionally in the present disclosure.

Furthermore, various different embodiments of the present disclosure may also be arbitrarily combined, and the combinations shall also be considered as the contents disclosed by the present disclosure without departing from the spirit of the present disclosure.

The invention claimed is:

1. A vision task execution method, the method comprising:
   acquiring raw image data which is collected by an image sensor and not processed by an image signal processor (ISP); and
   inputting the raw image data into a trained first raw image neural network for executing a target vision task to obtain a vision task processing result output by the first raw image neural network,
   wherein the first raw image neural network is obtained based on training with a raw image training set,
   training of the first raw image neural network further comprises:
   inputting traditional training images with labels into an aliasing model trained in advance to obtain sub-Nyquist image data, wherein the raw image training set further comprises the sub-Nyquist image data.

2. The method according to claim 1, wherein the training of the first raw image neural network further comprises:
   inputting the traditional training images with the labels into an ISP inverse mapping model trained in advance to obtain raw image training samples, wherein the raw image training set comprises the raw image training samples; and
   training the first raw image neural network according to the raw image training set.

3. The method according to claim 1, the method further comprising:
   determining a maximum allowable quantization level corresponding to the target vision task; and
   determining a minimum spatial-temporal sampling frequency corresponding to the target vision task,
   wherein the maximum allowable quantization level and the minimum spatial-temporal sampling frequency are back-propagated to the image sensor to enable a quantization level and a spatial-temporal sampling frequency of the image sensor to be adjusted according to the maximum allowable quantization level and the minimum spatial-temporal sampling frequency;

acquiring the raw image data collected by the image sensor comprises:

acquiring the raw image data collected by the image sensor with the adjusted quantization level and spatial-temporal sampling frequency.

4. The method according to claim 3, wherein determining the maximum allowable quantization level corresponding to the target vision task comprises:

acquiring multiple groups of compressed image data, wherein the quantization level of the image data in arbitrary one group of compressed image data is identical and lower than an average quantization level of the raw image training set, and the quantization level of the image data in arbitrary one group of compressed image data is different from that of the image data in another group of compressed image data;

dividing the image data in the multiple groups of compressed image data into training sets and testing sets, and training and testing a second raw image neural network for executing the target vision task according to the training set and the testing set of each group of compressed image data to obtain testing results of tests on the multiple trained second raw image neural networks; and determining a target raw image neural network, an execution result of which for the target vision task meets a first preset condition, in the multiple trained second raw image neural networks according to the testing results, and taking the maximum quantization level of the compressed image data for training the target raw image neural network as the maximum allowable quantization level of the target vision task.

5. The method according to claim 3, wherein determining the minimum spatial-temporal sampling frequency corresponding to the target vision task comprises:

acquiring multiple groups of sub-Nyquist image data, wherein spatial-temporal sampling frequencies of the image data in arbitrary one group of sub-Nyquist image data are identical and are different from those of the image data in another group of sub-Nyquist image data;

dividing the image data in multiple groups of sub-Nyquist image data into training sets and testing sets, and training and testing a third raw image neural network for executing the target vision task according to the training set and the testing set of each group of sub-Nyquist image data to obtain testing results of tests on the multiple trained third raw image neural networks; and determining a target raw image neural network, an execution result of which for the target vision task meets a second preset condition, in the multiple trained third raw image neural networks according to the testing results, and taking the minimum spatial-temporal sampling frequency of the sub-Nyquist image data for training the target raw image neural network which meets the second preset condition as the minimum spatial-temporal sampling frequency of the target vision task.

6. A non-transitory computer readable storage medium, having a computer program stored thereon, wherein the computer program is configured to be executed by a processor to:

acquire raw image data which is collected by an image sensor and not processed by an image signal processor (ISP); and input the raw image data into a trained first raw image neural network for executing a target vision task to obtain a vision task processing result output by the first raw image neural network, wherein the first raw image neural network is obtained based on training with a raw image training set, the computer program being further configured to:

input traditional training images with labels into an aliasing model trained in advance to obtain sub-Nyquist image data, wherein the raw image training set further comprises the sub-Nyquist image data.

7. The computer readable storage medium according to claim 6, wherein the computer program is further configured to be executed by the processor to:

input the traditional training images with the labels into an ISP inverse mapping model trained in advance to obtain raw image training samples, wherein the raw image training set comprises the raw image training samples; and train the first raw image neural network according to the raw image training set.

8. The computer readable storage medium according to claim 6, wherein the computer program is further configured to be executed by the processor to:

determine a maximum allowable quantization level corresponding to the target vision task; and determine a minimum spatial-temporal sampling frequency corresponding to the target vision task, wherein the maximum allowable quantization level and the minimum spatial-temporal sampling frequency are back-propagated to the image sensor to enable a quantization level and a spatial-temporal sampling frequency of the image sensor to be adjusted according to the maximum allowable quantization level and the minimum spatial-temporal sampling frequency;

acquire the raw image data collected by the image sensor comprises:

acquire the raw image data collected by the image sensor with the adjusted quantization level and spatial-temporal sampling frequency.

9. The computer readable storage medium according to claim 8, wherein determining the maximum allowable quantization level corresponding to the target vision task comprises:

acquire multiple groups of compressed image data, wherein the quantization level of the image data in arbitrary one group of compressed image data is identical and lower than an average quantization level of the raw image training set, and the quantization level of the image data in arbitrary one group of compressed image data is different from that of the image data in another group of compressed image data;

divide the image data in the multiple groups of compressed image data into training sets and testing sets, and training and testing a second raw image neural network for executing the target vision task according to the training set and the testing set of each group of compressed image data to obtain testing results of tests on the multiple trained second raw image neural networks; and determine a target raw image neural network, an execution result of which for the target vision task meets a first preset condition, in the multiple trained second raw image neural networks according to the testing results, and taking the maximum quantization level of the compressed image data for training the target raw image neural network as the maximum allowable quantization level of the target vision task.

10. The computer readable storage medium according to claim 8, wherein determining the minimum spatial-temporal sampling frequency corresponding to the target vision task comprises:
  acquire multiple groups of sub-Nyquist image data, wherein spatial-temporal sampling frequencies of the image data in arbitrary one group of sub-Nyquist image data are identical and are different from those of the image data in another group of sub-Nyquist image data;
  divide the image data in multiple groups of sub-Nyquist image data into training sets and testing sets, and training and testing a third raw image neural network for executing the target vision task according to the training set and the testing set of each group of sub-Nyquist image data to obtain testing results of tests on the multiple trained third raw image neural networks; and
  determine a target raw image neural network, an execution result of which for the target vision task meets a second preset condition, in the multiple trained third raw image neural networks according to the testing results, and taking the minimum spatial-temporal sampling frequency of the sub-Nyquist image data for training the target raw image neural network which meets the second preset condition as the minimum spatial-temporal sampling frequency of the target vision task.

11. An electronic device, comprising:
  a memory, having a computer program stored thereon; and
  a processor, used for executing the computer program in the memory to implement steps of a method, the method comprising:
  acquiring raw image data which is collected by an image sensor and not processed by an image signal processor (ISP); and
  inputting the raw image data into a trained first raw image neural network for executing a target vision task to obtain a vision task processing result output by the first raw image neural network,
  wherein the first raw image neural network is obtained based on training with a raw image training set,
  training of the first raw image neural network further comprises:
  inputting traditional training images with labels into an aliasing model trained in advance to obtain sub-Nyquist image data, wherein the raw image training set further comprises the sub-Nyquist image data.

12. The electronic device according to claim 11, wherein the training of the first raw image neural network further comprises:
  inputting the traditional training images with the labels into an ISP inverse mapping model trained in advance to obtain raw image training samples, wherein the raw image training set comprises the raw image training samples; and
  training the first raw image neural network according to the raw image training set.

13. The electronic device according to claim 11, the method further comprising:
  determining a maximum allowable quantization level corresponding to the target vision task; and
  determining a minimum spatial-temporal sampling frequency corresponding to the target vision task, wherein the maximum allowable quantization level and the minimum spatial-temporal sampling frequency are back-propagated to the image sensor to enable a quantization level and a spatial-temporal sampling frequency of the image sensor to be adjusted according to the maximum allowable quantization level and the minimum spatial-temporal sampling frequency;
  acquiring the raw image data collected by the image sensor comprises:
  acquiring the raw image data collected by the image sensor with the adjusted quantization level and spatial-temporal sampling frequency.

14. The electronic device according to claim 13, wherein determining the maximum allowable quantization level corresponding to the target vision task comprises:
  acquiring multiple groups of compressed image data, wherein the quantization level of the image data in arbitrary one group of compressed image data is identical and lower than an average quantization level of the raw image training set, and the quantization level of the image data in arbitrary one group of compressed image data is different from that of the image data in another group of compressed image data;
  dividing the image data in the multiple groups of compressed image data into training sets and testing sets, and training and testing a second raw image neural network for executing the target vision task according to the training set and the testing set of each group of compressed image data to obtain testing results of tests on the multiple trained second raw image neural networks; and
  determining a target raw image neural network, an execution result of which for the target vision task meets a first preset condition, in the multiple trained second raw image neural networks according to the testing results, and taking the maximum quantization level of the compressed image data for training the target raw image neural network as the maximum allowable quantization level of the target vision task.

15. The electronic device according to claim 13, wherein determining the minimum spatial-temporal sampling frequency corresponding to the target vision task comprises:
  acquiring multiple groups of sub-Nyquist image data, wherein spatial-temporal sampling frequencies of the image data in arbitrary one group of sub-Nyquist image data are identical and are different from those of the image data in another group of sub-Nyquist image data;
  dividing the image data in multiple groups of sub-Nyquist image data into training sets and testing sets, and training and testing a third raw image neural network for executing the target vision task according to the training set and the testing set of each group of sub-Nyquist image data to obtain testing results of tests on the multiple trained third raw image neural networks; and
  determining a target raw image neural network, an execution result of which for the target vision task meets a second preset condition, in the multiple trained third raw image neural networks according to the testing results, and taking the minimum spatial-temporal sampling frequency of the sub-Nyquist image data for training the target raw image neural network which meets the second preset condition as the minimum spatial-temporal sampling frequency of the target vision task.

16. A vision task system, comprising an image sensor and the electronic device of claim 11.

* * * * *